April 28, 1931.   G. D. CHARLES   1,803,233
WALL BOX
Filed April 18, 1925

Inventor
George D. Charles
By C. A. Snow & Co.
Attorneys

Patented Apr. 28, 1931

1,803,233

UNITED STATES PATENT OFFICE

GEORGE D. CHARLES, OF HUNTINGTON, WEST VIRGINIA

WALL BOX

Application filed April 18, 1925. Serial No. 24,184.

The present invention relates to a novel form of wall box especially designed so that a single box may be utilized for housing an electric bell, and its magnets, as well as a transformer so that the bell may be operated by the usual house current.

Another important object of the invention is the provision of a unit structure wherein the bell, its magnets and transformer are supported within a container, a suitable bracket member being provided to permit the container to be positioned while the wall box is positioned within a wall.

A still further object of the invention is the provision of an electrically-controlled audible signaling device which will be concealed in the wall.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
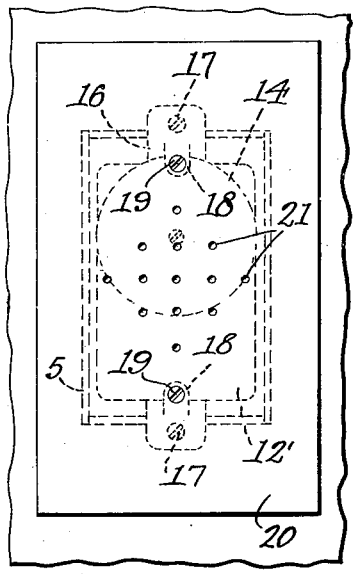
Figure 1 is an elevational view illustrating a wall box as positioned in a wall.
Figure 2:
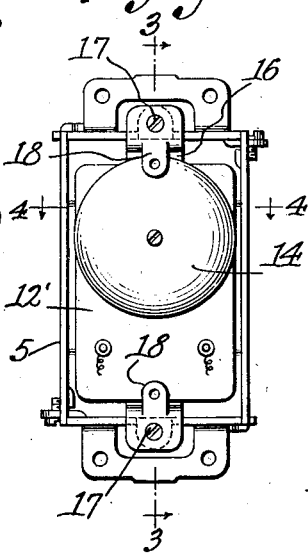
Figure 2 is an elevational view of the wall box, the cover thereof being removed.

Referring to the drawing in detail, the reference character 5 indicates the body portion of the wall box which is provided with outwardly extended portions formed with openings to accommodate the securing screws 6, whereby the box may be secured within a wall.

The reference character 7 indicates the container employed for housing the transformer, which is indicated at 8, and magnets 9 forming a part of the bell construction, and as shown, a strip of insulating material indicated at 10 is positioned within the container 7 to insulate the transformer from the body of the container which is formed preferably of metal.

Positioned within the container 7 is a partitioning member 11 which is adapted to engage the transformer and partition the transformer from the magnets 9. A suitable spring clip indicated at 12 is positioned within the container 7 and is of a construction to frictionally engage the side walls of the container 7 and hold the partitioning member 11 in position.

Figure 3:
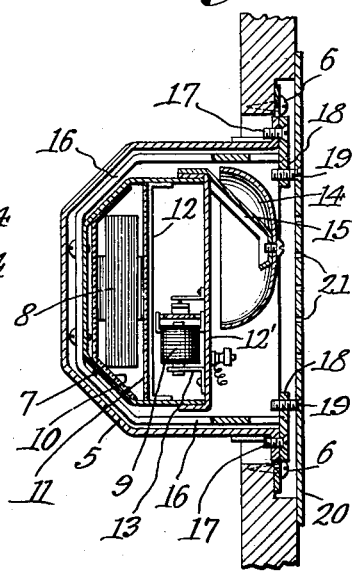
Figure 3 is a sectional view taken on line 3—3 of Figure 2.
Figure 4:
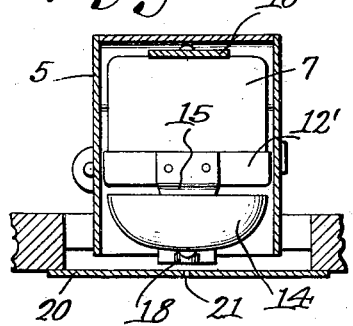
Figure 4 is a sectional view taken on line 4—4 of Figure 2.

The cover for the container 7 is indicated by the reference character 12' and acts as a support for the magnets 9 which are connected to the cover by means of the brackets 13. This cover also acts as a support for the signaling device, which in the present showing is in the form of a bell and indicated by the reference character 14. An arm 15 has connection with the cover and acts as a support for the bell as clearly shown by Figure 3 of the drawing.

The container is secured to a supporting member which is indicated at 16, which supporting member is in the form of a length of metal shaped to conform to the shape of the box or body portion, the ends of the supporting member being extended outwardly where they are provided with openings to receive the securing screws 17, to the end that the container and various elements supported therein may be removed by removing the securing screws 17 and lifting the supporting member from its position within the wall box.

Portions of the supporting member extend inwardly as at 18 where they are provided with threaded openings to accommodate the screws 19 that are employed for holding the finishing plate 20 in position, the finishing plate being provided with a plurality of openings 21 to allow the sound to pass from the box.

Figure 6:
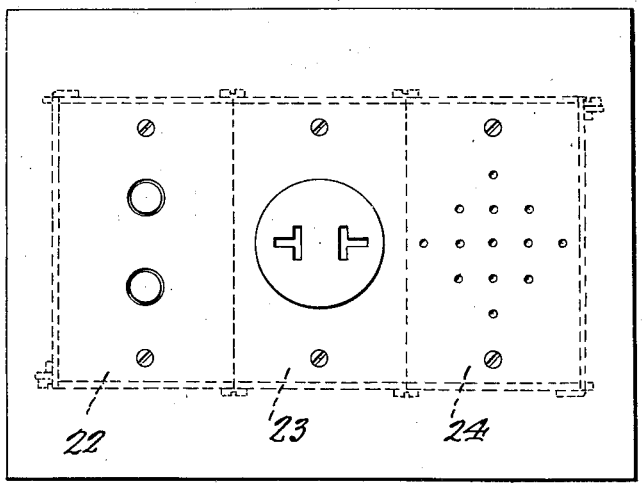
Figure 6 is an elevational view illustrating several wall boxes connecting and supporting various articles.
Figure 5:
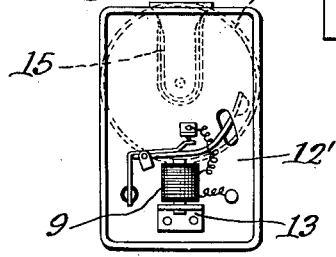
Figure 5 is a bottom plan view of the cover of the container for the magnets and transformer.

In Figure 6 of the drawing, I have illustrated a number of these boxes connected, the reference character 22 indicating a switch box, while the reference character 23 indicates a receptacle box, and the reference character 24 indicates a box containing an audible signal and transformer constructed in accordance with the invention, making an exceptionally neat and efficient structure for use in house wiring, and one wherein the usual unsightly bell is eliminated.

I claim:—

1. An electric bell assembly for positioning in a wall receptacle, comprising a supporting member shaped to conform to the shape of a wall receptacle, and having laterally extended end portions overlying the upper edge of the wall receptacle in which the supporting member is positioned, screws extending through the laterally extended ends of the supporting member, a container secured to the supporting member, a transformer in the container, a cover for the container, a bell magnet secured to one side of the cover, a bell secured to the opposite side of the cover, a bell tapper extending through the cover to strike the bell, and a cover plate having openings for closing the receptacle.

2. An electric bell assembly for positioning in a wall receptacle, comprising a supporting bar, a container secured to the supporting bar, a transformer secured within the container, a partition within the container and providing a transformer compartment with the bottom of the container, a cover for the container, a magnet secured to one side of the cover, a sounding device mounted on the opposite side of the cover, a tapper extending through the cover and adapted to strike the sounding device, and the ends of the supporting bar extending at right angles to be secured to the receptacle to mount the bar within the receptacle.

3. An electric signal assembly adapted to be detachably mounted as a whole in a standard wall box below the usual securing flanges at the edge thereof, said assembly comprising: a container, means for detachably securing the container in said box, a transformer in the container, a partition arranged in the container to form therewith a casing for said transformer, and audible electrical signalling mechanism operably connected to said transformer and supported by the container outside the said casing.

In testimony that I claim the foregoing as my own, I have hereto affixed my signature.

GEORGE D. CHARLES.